(12) United States Patent
Hoogerbrugge et al.

(10) Patent No.: US 10,599,820 B2
(45) Date of Patent: Mar. 24, 2020

(54) CONTROL FLOW FLATTENING FOR CODE OBFUSCATION WHERE THE NEXT BLOCK CALCULATION NEEDS RUN-TIME INFORMATION

(71) Applicant: NXP B.V., Eindhoven (NL)

(72) Inventors: Jan Hoogerbrugge, Eindhoven (NL); Phillippe Teuwen, Eindhoven (NL); Wil Michiels, Eindhoven (NL)

(73) Assignee: NXP B.V., Eindhoven (NL)

( * ) Notice: Subject to any disclaimer, the term of this patent is extended or adjusted under 35 U.S.C. 154(b) by 561 days.

(21) Appl. No.: 14/259,395

(22) Filed: Apr. 23, 2014

(65) Prior Publication Data

US 2015/0310193 A1    Oct. 29, 2015

(51) Int. Cl.
*G06F 21/00* (2013.01)
*G06F 21/14* (2013.01)

(52) U.S. Cl.
CPC ...... *G06F 21/14* (2013.01); *G06F 2221/0748* (2013.01)

(58) Field of Classification Search
None
See application file for complete search history.

(56) References Cited

U.S. PATENT DOCUMENTS

| | | | |
|---|---|---|---|
| 6,157,955 A * | 12/2000 | Narad | H04L 45/16 709/228 |
| 6,199,095 B1 * | 3/2001 | Robinson | G06F 9/4488 718/107 |
| 6,657,179 B1 | 12/2003 | Henno | |
| 7,254,720 B1 * | 8/2007 | Giles | G06F 12/1491 380/210 |
| 8,422,668 B1 * | 4/2013 | Thichina | H04L 9/003 380/28 |
| 2005/0183072 A1 * | 8/2005 | Horning | G06F 21/14 717/140 |

(Continued)

FOREIGN PATENT DOCUMENTS

| | | |
|---|---|---|
| CN | 1855541 A | 11/2006 |
| CN | 101568927 A | 10/2009 |

(Continued)

OTHER PUBLICATIONS

Computer Desktop Encyclopedia definition of "processor": http://lookup.computerlanguage.com/host_app/search?cid=C999999&term=processor&lookup.x=0&lookup.y=0.*

(Continued)

*Primary Examiner* — Jeremiah L Avery

(57) ABSTRACT

A method of obscuring software code including a plurality of basic blocks wherein the basic blocks have an associated identifier (ID), including: determining, by a processor, for a first basic block first predecessor basic blocks, wherein first predecessor basic blocks jump to the first basic block and the first basic block jumps to a next basic block based upon a next basic block ID; producing, by the processor, a mask value based upon the IDs of first predecessor basic blocks, wherein the mask value identifies common bits of the IDs of the first predecessor basic blocks; and inserting, by the processor, an instruction in the first basic block to determine a next basic block ID based upon the mask value and an ID of one of the first predecessor basic blocks.

22 Claims, 1 Drawing Sheet

(56) References Cited

U.S. PATENT DOCUMENTS

| | | | |
|---|---|---|---|
| 2006/0061795 A1* | 3/2006 | Walmsley | G06F 21/73 358/1.14 |
| 2006/0143454 A1* | 6/2006 | Walmsley | G06F 21/85 713/170 |
| 2008/0077771 A1* | 3/2008 | Guttag | G06F 7/53 712/204 |
| 2008/0077794 A1* | 3/2008 | Arnold | H04L 9/0822 713/169 |
| 2009/0160991 A1 | 6/2009 | Kim | |
| 2012/0005391 A1* | 1/2012 | Byrne | G06F 13/4027 710/313 |
| 2013/0232323 A1 | 9/2013 | Lerouge et al. | |
| 2014/0165208 A1* | 6/2014 | Chevallier-Mames | G06F 21/14 726/26 |

FOREIGN PATENT DOCUMENTS

| | | |
|---|---|---|
| CN | 102132289 A | 7/2011 |
| JP | 2001085660 A | 3/2003 |

OTHER PUBLICATIONS

Downey, Gregory J. Making Media Work: Time, Space, Identity, and Labor in the Analysis of Information and Communication Infrastructures. pp. 141-165. MIT Press. https://ieeexplore.ieee.org/xpl/ebooks/bookPdfWithBanner.jsp?fileName=6733921.pdf& bkn=6731153&pdfType=chapter (Year: 2013).*

Yu, Fang et al. Nemor: A Congestion-Aware Protocol for Anonymous Peer-based Content Distribution. 2011 IEEE International Conference on Peer-to-Peer Computing. https://ieeexplore.ieee.org/stamp/stamp.jsp?tp=&arnumber=6038744 (Year: 2011).*

An overview of control flow graph flattening, Jan Cappaert and Bart Preneel, K.U. Leuven/ESAT/SCD-COSIC, re-trust.dit.unitn.it/files/20081015Doc/session2-1Cappaert.pdf.

T. Laszlo et al., "Obfuscating C++ Programs via Control Flow Flattening," *Annales Uni. Sci. Budapest, Sect. Comp.* 30 (2009) 3-19.

EP Communication and EP Search Report dated Sep. 14, 2015.

Atallah, et al., "XP055211446", http://www.cerias.purdue.edu/news_and_events/symposium/2001/talks/tlk_10.pdf, Sep. 4, 2015.

Chenxi, et al., "Protection of software based survivability mechanisms", IEEE Comp. Soc. US, Proceedings International Conference on Dependable Systems and Networks, Jul. 1-4, 2001, 193-202.

* cited by examiner

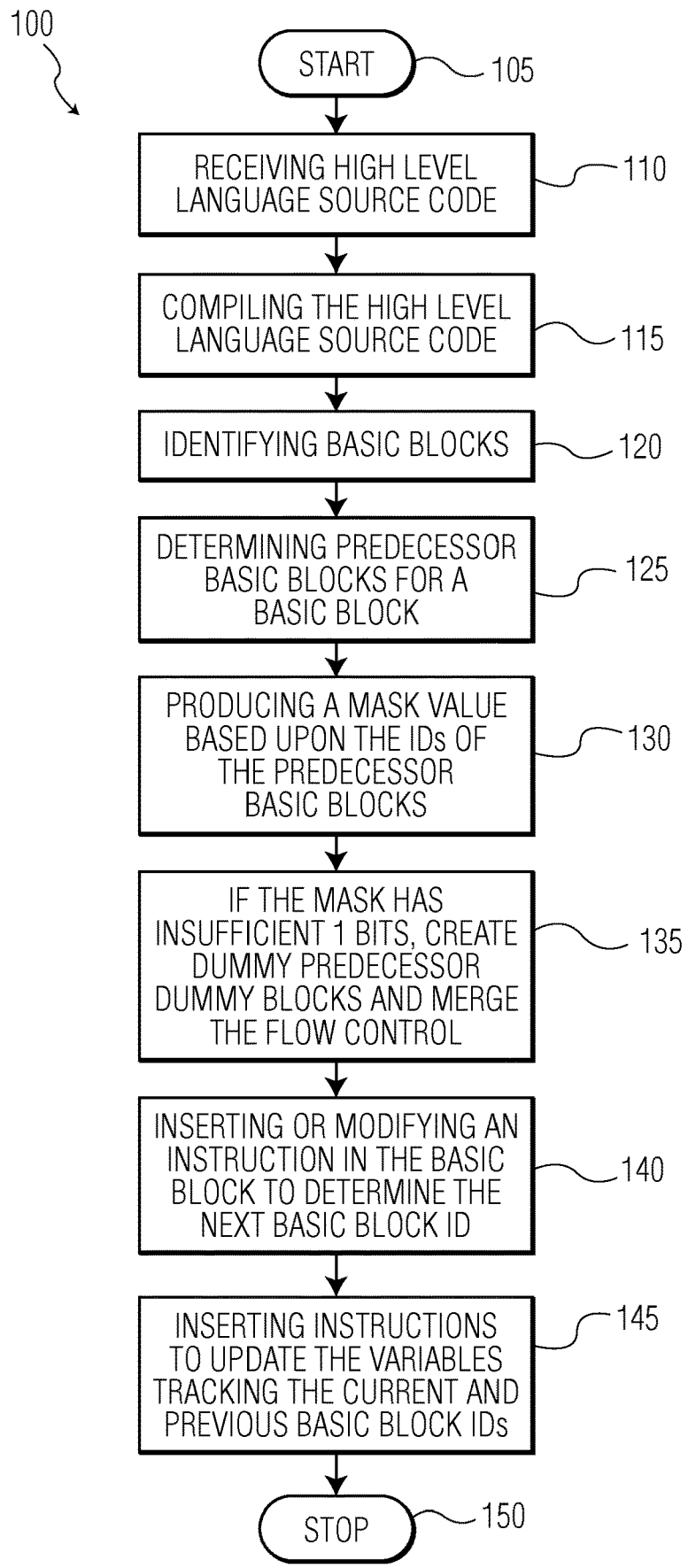

CONTROL FLOW FLATTENING FOR CODE OBFUSCATION WHERE THE NEXT BLOCK CALCULATION NEEDS RUN-TIME INFORMATION

TECHNICAL FIELD

Various exemplary embodiments disclosed herein relate generally to control flow flattening for code obfuscation where the next block calculation needs run-time information.

BACKGROUND

Today software applications are widely used to provide various services to users. These software applications may be hosted on a variety of different devices, such as for example, mobile phones, personal computers, laptop computers, tablets, set top boxes, etc. Software applications are found in may systems in use by consumers or in industrial systems. Software applications are also found in smart cards and credit cards. Further, software applications may be implemented across networks such as the internet, where the software application runs on servers, and is accessed using various user devices. Many of these software applications require the use of security protocols to protect content, information, transactions, and privacy. Many software applications are run in environments where an attacker has complete control of the operation of the software application, and an attacker my attempt to reverse engineer the code of the software application in order to gain access to secure information or to even understand the operation of the software in order to reproduce or modify the functionality of the software application. An attacker may user various reverse engineering tools, such as for example, code analyzers and debuggers, to obtain information related to the software application. Accordingly, techniques have been developed to in order to make it hard for an attacker to reverse engineer software. One way to make reverse engineering of the code more difficult is code obfuscation. Code obfuscation seeks to create obfuscated code that is difficult for humans to understand. Code obfuscation may be used to conceal a software application's purpose or its logic, so as to prevent tampering or reverse engineering of the software application.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various exemplary embodiments relate to a method of obscuring software code including a plurality of basic blocks wherein the basic blocks have an associated identifier (ID), including: determining, by a processor, for a first basic block first predecessor basic blocks, wherein first predecessor basic blocks jump to the first basic block and the first basic block jumps to a next basic block based upon a next basic block ID; producing, by the processor, a mask value based upon the IDs of first predecessor basic blocks, wherein the mask value identifies common bits of the IDs of the first predecessor basic blocks; and inserting, by a processor, an instruction in the first basic block to determine a next basic block ID based upon the mask value and an ID of one of the first predecessor basic blocks.

Various embodiments are described wherein determining the next basic block ID is further based upon a condition.

Various embodiments are described further including producing a table of basic block addresses indexed by basic block IDs.

Various embodiments are described wherein the mask value is calculated by calculating a first result by bit-wise ANDing the IDs of the first predecessor basic blocks, by calculating a second result by bit-wise ANDing the inverses of the IDs of the first predecessor basic block, and bit-wise ORing the first result and the second result.

Various embodiments are described wherein the first predecessor basic blocks are a plurality of dummy basic blocks, wherein the plurality of dummy basic blocks have a second plurality of predecessor basic blocks, wherein the plurality of dummy basic blocks merge the control flow from the second plurality of predecessor basic blocks to the basic block.

Various embodiments are described further including: receiving software code in a higher order language; and compiling the received software code into the software code with basic blocks.

Various embodiments are described wherein compiling the received software code includes determining for a first basic block the first predecessor basic blocks, producing the mask value, and inserting the instruction in the first basic block.

Various embodiments are described wherein determining the next basic block ID is determined by the following calculation: bb_next=(bb_prev & mask)+(cond ? (ID_then_BB−(ID_prev_BB & mask)):(ID_else_BB−(ID_prev_BB & mask))), where bb_next is the next basic block ID, bb_prev is one predecessor basic block ID, mask is the mask value, cond is a Boolean value or expression, ID_then_BB and ID_else_BB are the IDs of the next basic blocks depending on the value of cond, and ID_prev_BB is the ID of an arbitrary predecessor block.

Various embodiments are described wherein when the first basic block ends by falling through to a next basic block, inserting a jump instruction to the next basic block.

Various embodiments are described further including shuffling the plurality of basic blocks.

Further, various exemplary embodiments relate to a non-transitory machine-readable storage medium encoded with instructions of a basic block of software code for execution by a processor, the non-transitory machine-readable storage medium including: instructions for determining the identifier (ID) of a next basic block based upon a mask, an ID of a predecessor basic block, and an ID based upon a condition; and instructions for jumping to the next basic block, wherein the mask identifies common bits in a first plurality of predecessor basic blocks.

Various embodiments are described further including: instructions for setting a variable identifying the predecessor basic block to the ID of the basic block; and instructions for setting a variable identifying the basic block to the determined ID of the next basic block.

Various embodiments are described wherein the mask is calculated by calculating a first result by bit-wise ANDing the IDs of the first predecessor basic blocks, by calculating a second result by bit-wise ANDing the inverses of the IDs of the first predecessor basic block, and bit-wise ORing the first result and the second result.

Various embodiments are described wherein the first predecessor basic blocks are a plurality of dummy basic blocks, wherein the plurality of dummy basic blocks have a second plurality of predecessor basic blocks, wherein the plurality of dummy basic blocks merge the control flow from the second plurality of predecessor basic blocks to the basic block.

Various embodiments are described wherein instructions for jumping to the next basic block include accessing a table of basic block addresses indexed by basic block IDs based upon the ID of the determined next basic block.

Various embodiments are described wherein instructions for determining the ID of the next basic block is calculated using the following calculation: bb_next=(bb_prev & mask)+(cond ? (ID_then_BB−(ID_prev_BB & mask)):(ID_else_BB−(ID_prev_BB & mask))), where bb_next is the next basic block ID, bb_prev is one predecessor basic block ID, mask if the mask value, cond is a Boolean value or expression, ID_then_BB and ID_else_BB are the IDs of the next basic blocks depending on the value of cond, and ID_prev_BB is the ID of an arbitrary predecessor block.

Further, various exemplary embodiments relate to a method of executing instructions of a basic block of software code for execution by a processor, including: determining, by a processor, the identifier (ID) of a next basic block based upon a mask, an ID of a predecessor basic block, and an ID based upon a condition; and jumping, by the processor, to the next basic block, wherein the mask identifies common bits in a first plurality of predecessor basic blocks.

Various embodiments are described further including: setting, by the processor, a variable identifying the predecessor basic block to the ID of the basic block; and setting, by the processor, a variable identifying the basic block to the determined ID of the next basic block.

Various embodiments are described wherein the mask is calculated by calculating a first result by bit-wise ANDing the IDs of the first predecessor basic blocks, by calculating a second result by bit-wise ANDing the inverses of the IDs of the first predecessor basic block, and bit-wise ORing the first result and the second result.

Various embodiments are described wherein the first predecessor basic blocks are a plurality of dummy basic blocks, wherein the plurality of dummy basic blocks have a second plurality of predecessor basic blocks, wherein the plurality of dummy basic blocks merge the control flow from the second plurality of predecessor basic blocks to the basic block.

Various embodiments are described wherein jumping to the next basic block include accessing a table of basic block addresses indexed by basic block IDs based upon the ID of the determined next basic block.

Various embodiments are described wherein determining the ID of the next basic block is calculated using the following calculation: bb_next=(bb_prev & mask)+(cond ? (ID_then_BB−(ID_prev_BB & mask)):(ID_else_BB−(ID_prev_BB & mask))), where bb_next is the next basic block ID, bb_prev is one predecessor basic block ID, mask if the mask value, cond is a Boolean value or expression, ID_then_BB and ID_else_BB are the IDs of the next basic blocks depending on the value of cond, and ID_prev_BB is the ID of an arbitrary predecessor block.

BRIEF DESCRIPTION OF THE DRAWINGS

In order to better understand various exemplary embodiments, reference is made to the accompanying drawings, wherein:

FIG. 1 illustrates a method of obscuring software code.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

A software application may be implemented using a plurality of basic blocks. The plurality of basic blocks are interconnected, in the sense that some of the blocks build on the processed data of one or more of the predecessor blocks. For example, a basic block may use a plurality of computer instructions, including arithmetical instructions, which together implement the functionality of the basic block. A basic block is a portion of code within the software application with only one entry point and only one exit point. A basic block has a first instruction, and when the first instruction is executed, the rest of the instructions in the basic block are necessarily executed exactly once in order. Code obfuscation may be used to implement the software application. The basic blocks to which control may transfer after reaching the end of a basic block are called the basic block's successors. The basic blocks from which control may have come when entering a basic block are called the basic block's predecessors. Further, code obfuscation may be used with other methods of implementing a software applications such as lookup tables or finite state machines in order to prevent attacks on the software application.

The network of basic blocks are arranged to perform the functions of the software application. Typically, the software application may receive input information that is operated upon by a number of basic input blocks. A number of further basic blocks may take input from one or more of the basic input blocks and/or from the input information. Yet further basic blocks can take input in any combination of the input information, the output of basic input blocks and the output of the further basic blocks. Finally a set of basic exit blocks may produce an output of some sort. In this manner a network of basic blocks emerges which collectively performs the function of the software application.

In many situations software applications have to be protected against attackers that attempt to reverse engineer the code, such as in the examples mentioned above. Attackers may use sophisticated tools to analyze software in binary form to understand what the software is doing and how the software works. One effective and known technique to counter such analysis is control flow flattening where all structure from the control flow graph of a function is removed. Every basic block may end with a small computation that determines the next basic block to be executed. This technique is described in "Surreptitious Software—Obfuscation, Watermarking, and Tamperproofing for Software Protection", Christian Collberg, Jasvir Nagra, Addison-Wesley Software Security Series, Editor: Gary McGraw, 792 pages, ISBN: 0-321-54925-2, August 2009. Accordingly, it is desirable to make this computation such that a reverse engineering tool cannot determine from the code in a basic block which successor basic blocks it may have. Other techniques are known where the computation of the successor basic block needs information that is not available in the current basic block. Such a technique is described in "An overview of control flow graph flattening", Jan Cappaert and Bart Preneel, K. U. Leuven/ESAT/SCD-COSIC, RE-TRUST 2008 First International Workshop on Remote Entrusting, Oct. 15-16, 2008, Trento Italy (see ReTrust website). As described in the embodiments herein, this may be accomplished by computing the identification (ID) of the successor basic block out of the sum of the ID of the last executed basic block and a constant delta. Though a problem is that the basic block might have multiple predecessor basic blocks, each with their own ID. This problem may be overcome by determining the common bits in the IDs of all predecessor basic blocks and by using these common bits as a mask that is applied on the ID of the last executed basic block before adding the constant delta. Compared to the prior techniques, the embodiments described herein require a less costly computation that results in a lower performance penalty in terms of execution time overhead and code size increase.

An overview of the embodiments will now be give. The embodiments seek to rewrite basic blocks like:

```
curr_BB:
   inst1
   inst2
   inst3
   ...
   cjmp cond, then_BB
else_BB:
```

The above basic block may be rewritten as follows:

```
curr_BB:
  inst1
  inst2
  inst3
  ...
  bb_next = (bb_prev & mask) +
(cond ? (ID_then_BB – (ID_prev_BB & mask))
                  : (ID_else_BB – (ID_prev_BB &
            mask)))
  bb_prev = bb
  bb = bb_next
  jmp bb_table[bb]
```

The following definitions apply to the basic blocks described above:
  X & Y denotes a bit-wise AND of X with Y;
  C ? X:Y means that if condition C is true the value is X and the value is Y otherwise;
  the successor of the current basic block curr_BB is either then_BB or else_BB depending of the value of cond;
  ID_xyz is an identifier for basic block xyz that may be used to index a table of basic block addresses called bb_table;
  ID_prev_BB is the ID of an arbitrary predecessor basic block;
  bb, bb_prev, and bb_next are variables to keep track of the current, predecessor, and next basic block during execution;

the value mask is a constant that selects all bits of an ID that have the same value in all IDs of the predecessor basic blocks; the mask will have all bits set if the current basic block has a single predecessor basic block; and all basic block addresses are stored in a table called bb_table that is indexed by basic block IDs.

While the added code might look expensive at first sight, the compiler may simplify the code easily because the IDs and the mask are constant.

A reverse engineering tool will analyze a program in binary format by partitioning it into functions and partitioning the functions into basic blocks. For each function the reverse engineering tool creates a control flow graph where the nodes represent the basic blocks and the edges control flow between the basic block. For example, an edge (b1, b2) means that after execution of basic block b1 the next block could be b2. When the control flow graph is presented to the user in a clear manner then the user can get a lot of insight into the code. The control flow graph will clearly show how code is organized in, for example, loops and if-then-else constructs.

For example, consider a basic block that ends with a conditional jump:

```
curr_BB:
   inst1
   inst2
   inst3
   ...
   cjmp cond, then_BB
else_BB:
```

In this code the current basic block called curr_BB includes a sequence of instructions terminated by a conditional jump that jumps to basic block then_BB if condition cond is true and the execution proceeds to the following basic block, called else_BB, otherwise (or in some cases may simply fall through to the next adjacent basic block).

By directly specifying then_BB in the instruction stream and because cjmp is a conditional jump, the reverse engineering tool immediately knows that (curr_BB, then_BB) and (curr_BB, else_BB) are edges in the control flow graph. This explicit specification may be removed by a known technique called control flow flattening. The idea is to assign an ID to every basic block in a function (or a collection of functions) and to create a table of basic block addresses that can be indexed with these IDs. Instead of using a so called conditional or unconditional direct jump to terminate a basic block, control flow flattening terminates each basic block with an indirect jump where the address is obtained from the table. The example code will become:

```
curr_BB:
   inst1
   inst2
   inst3
   ...
   bb = cond ? ID_then_BB : ID_else_BB
   jmp bb_table[bb]
```

A less advanced reverse engineering tool cannot do much more with the indirect jump at the end of the basic block than assuming that it can jump to all basic blocks in the code (because all basic blocks are referenced from the bb_table it knows where basic blocks begin and it does not have to assume that the indirect jump can jump to every instruction in the code). However, a more advanced reverse engineering tool can analyze that bb is either ID_then_BB or ID_else_BB and uses this to construct a precise control flow graph. A method to prevent this is to make the computation of bb dependent on something that is not available in the current basic block and becomes only available during execution of the code. This may be achieved by keeping track of the last executed basic block and by using this value as a reference to determine the next basic block to be executed. This is what the example code then becomes:

```
curr_BB:
    inst1
    inst2
    inst3
    ...
    bb_next = bb_prev + (cond ? (ID_then_BB - ID_prev_BB)
                              : (ID_else_BB - ID_prev_BB))
    bb_prev = bb
```

-continued

```
    bb = bb_next
    jmp bb_table[bb]
```

So the code keeps track of the last executed basic block in the variable bb_prev, and the next basic block may be computed by adding to bb_prev a delta that is the difference of the ID of the target basic block and the ID of the last executed basic block. The approach has one problem. Most basic blocks do not have a unique predecessor basic block that can be used to base a delta on. This is where embodiments of the invention apply in order to overcome this problem.

If a basic block has n predecessor basic blocks with IDs $P_1 \ldots P_n$ then the common bits in $P_1 \ldots P_n$ may be determined. This may simply be done by bit-wise ANDing $P_1 \ldots P_n$ and bit-wise ANDing of bit-wise inverses of $P_1 \ldots P_n$. The results are the bit positions that are one in all predecessor basic block IDs and that are zero in all predecessor basic block IDs, respectively. Bit-wise ORing these two numbers gives the bits that are equal in all predecessor basic block IDs. This resulting value may be used as a mask to remove bits from the predecessor basic block IDs that cannot be used in the computation. The resulting code is then:

```
curr_BB:
    inst1
    inst2
    inst3
    ...
    bb_next = (bb_prev & mask) + (cond ?
                    (ID_then_BB - (ID_prev_BB & mask))
                  : (ID_else_BB - (ID_prev_BB & mask)))
    bb_prev = bb
    bb = bb_next
    jmp bb_table[bb]
```

Notice that mask is a constant specific for every basic block. Furthermore, ID_prev_BB is an ID of an arbitrary predecessor basic block.

By transforming the basic blocks as described above, basic blocks are obtained that end with an indirect jump where the address of the indirect jump cannot be determined from the basic block in isolation and the basic block table.

The embodiments may easily be extended by not only hiding successor basic blocks but also hiding which function is being called in a direct function call. The bb_table may then be extended to include function addresses. This means that both the control flow graphs of the functions as well as the call graph of the program are obscured. An example of such code is:

```
curr_BB:
    inst1
    inst2
    inst3
    ...
    function_next = (bb_prev & mask) + ID_func -
    (ID_prev_BB & mask))
    call bb_table[function_next]
    ...
    bb_next = (bb_prev & mask) + (cond ?
                    (ID_then_BB - (ID_prev_BB & mask))
                  : (ID_else_BB - (ID_prev_BB & mask)))
    bb_prev = bb
    bb = bb_next
    jmp bb_table[bb]
```

If a basic block has many predecessor basic blocks, it is likely that the IDs of these many predecessor blocks have few if any bits in common. The result is that mask will have few bits set or become zero. This might make the task of determining the function of the code by the reverse engineering tool/attacker easier. This may be avoided by assigning IDs to blocks such that predecessor blocks of a common basic block have many bits in their IDs in common. Alternatively, with many predecessor basic blocks, one can merge the control flow in a few steps with dummy basic blocks so that every basic block has a few predecessor basic blocks. For example, say a basic block g has 8 potential predecessor basic blocks $p_1 \ldots p_8$. Then predecessor basic blocks would jump to intermediate basic blocks $h_1$ and $h_2$ instead as follows: basic blocks $p_1 \ldots p_4$ jump to basic block $h_1$ and basic blocks $p_5 \ldots p_8$ jump to basic block $h_2$. Then the basic block g has only two predecessor basic blocks $h_1$ and $h_2$ rather than 8.

In the explanation of the embodiments herein, basic blocks that do not terminate with a jump because they fall through to the following basic block were not discussed. These fall through situations may be handled by terminating the basic block with a direct jump that jumps to the following basic block. Therefore, after control flow flattening has been applied there are no fall-through basic blocks in the code. As a result, all basic blocks may therefore be shuffled in order to further obfuscate the program code.

In many descriptions of control flow flattening, the resulting code is shown as an infinite loop with a switch statement in it that selects the next basic block to be executed. This organization has more overhead than the organization that we described (with a direct jump at the end of each basic block). However, the idea of tracking the last executed basic block and applying a mask on it to compute the next basic block can be applied to this type of control flow flattening as well.

The embodiments described herein may be implemented in a complier that compiles a higher order language into machine code for execution on a processor. Also, the embodiments may be applied to existing machine code to obscure the operation of that machine code.

FIG. 1 illustrates a method of obscuring software code. The method 100 may begin at 105. Next, the method may receive high level language source code 110. Then the method 100 may compile the high level language source code 115. Next, the method 100 may identify basic blocks in the compiled code 120. Then the method 100 may for each basic block determine predecessor basic blocks 125. Next, based upon the list of predecessor basic blocks, the method 100 may produce a mask value based upon the IDs of the predecessor basic blocks 130. This may be done as described above. Then a check may be made to determine the number of 1 bits indicating the number of comment bits in the predecessor basic block IDs. If there are an insufficient number of 1 bits, then dummy predecessor blocks may be created 135 and the flow control to the basic block may be merged. This was described in more detail above. If there are a sufficient number of 1 bits in the mask, this step may be skipped. Next, the method 100 may insert a jump instruction into the basic block or modify a jump instruction in the basic block 140 to take into account the mask and the predecessor basic block ID as described above. Then the method 100 may insert instruction into the basic block to update the variables tracking the current and previous basic block IDs 145. Then the method may end at 150. Part of the method may also include creating a table of basic block addresses that are indexed by the basic block IDs. For example, this table may be created in step 120 when the basic blocks are identified. This table may then be updated as a result of further steps in the method. For example, as described above the various basic blocks may be shuffled, and the table may be modified accordingly. This method may all be performed in a compiler when code is compiled. Also, many of the steps may be applied independent of the compiler after the code has been compiled. Various aspects of the steps in the method 100 are discussed in the embodiments described above.

A method according to the embodiments of the invention may be implemented on a computer system as a computer implemented method. Executable code for a method according to the invention may be stored on a computer program medium. Examples of computer program media include memory devices, optical storage devices, integrated circuits, servers, online software, etc. Such a computer system, may also include other hardware elements including storage, network interface for transmission of data with external systems as well as among elements of the computer system.

In an embodiment of the invention, the computer program may include computer program code adapted to perform all the steps of a method according to the invention when the computer program is run on a computer. Preferably, the computer program is embodied on a non-transitory computer readable medium.

A method of creating the obscured code of a white-box implementation according to the invention may be implemented on a computer as a computer implemented method. Executable code for a method according to the embodiments may be stored on a computer program medium. In such a method, the computer program may include computer program code adapted to perform all the steps of the method when the computer program is run on a computer. The computer program is embodied on a non-transitory computer readable medium.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory. Further, as used herein, the term "processor" will be understood to encompass a variety of devices such as microprocessors, field-programmable gate arrays (FPGAs), application-specific integrated circuits (ASICs), and other similar processing devices. When software is implemented on the processor, the combination becomes a single specific machine.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method of obscuring software code within a software application including a plurality of basic blocks wherein the basic blocks have an associated identifier (ID) and the basic block is a portion of software code within the software application, comprising:
    determining, by a processor, for a first basic block, first predecessor basic blocks, wherein each of the first predecessor basic blocks have a unique ID and first predecessor basic blocks jump to the first basic block and the first basic block jumps to a next basic block based upon a next basic block ID;
    producing, by the processor, a mask value based upon the IDs of first predecessor basic blocks, wherein the mask value identifies common bits of the IDs of the first predecessor basic blocks; and
    inserting, by a processor, an instruction in the first basic block to determine a next basic block ID based upon the mask value and an ID of one of the first predecessor basic blocks.

2. The method of claim 1, wherein determining the next basic block ID is further based upon a condition.

3. The method of claim 1, further comprising producing a table of basic block addresses indexed by basic block IDs.

4. The method of claim 1, wherein the mask value is calculated by calculating a first result by bit-wise ANDing the IDs of the first predecessor basic blocks, by calculating a second result by bit-wise ANDing the inverses of the IDs of the first predecessor basic block, and bit-wise ORing the first result and the second result.

5. The method of claim 1, wherein the first predecessor basic blocks are a plurality of dummy basic blocks, wherein the plurality of dummy basic blocks have a second plurality of predecessor basic blocks, wherein the plurality of dummy basic blocks merge the control flow from the second plurality of predecessor basic blocks to the basic block.

6. The method of claim 1, further comprising:
receiving software code in a higher order language; and
compiling the received software code into the software code with basic blocks.

7. The method of claim 6, wherein compiling the received software code includes determining for a first basic block the first predecessor basic blocks, producing the mask value, and inserting the instruction in the first basic block.

8. The method of claim 1, wherein determining the next basic block ID is determined by the following calculation: bb_next=(bb_prev & mask)+(cond ? (ID_then_BB−(ID_prev_BB & mask)):(ID_else_BB−(ID_prev_BB & mask))), where bb_next is the next basic block ID, bb_prev is one predecessor basic block ID, mask is the mask value, cond is a Boolean value or expression, ID_then_BB and ID_else_BB are the IDs of the next basic blocks depending on the value of cond, and ID_prev_BB is the ID of an arbitrary predecessor block.

9. The method of claim 1, wherein when the first basic block ends by falling through to a next basic block, inserting a jump instruction to the next basic block.

10. The method of claim 9, further comprising shuffling the plurality of basic blocks.

11. A non-transitory machine-readable storage medium encoded with instructions of a basic block of software code within a software application for execution by a processor wherein the basic blocks have an associated identifier (ID) and the basic block is a portion of software code within the software application, the non-transitory machine-readable storage medium comprising:
instructions for determining the ID of a next basic block based upon a mask, an ID of a predecessor basic block, and an ID based upon a condition; and
instructions for jumping to the next basic block,
wherein the mask identifies common bits in IDs of a first plurality of predecessor basic blocks and each of the first predecessor basic blocks have a unique ID.

12. The non-transitory machine-readable storage medium of claim 11, further comprising:
instructions for setting a variable identifying the predecessor basic block to the ID of the basic block; and
instructions for setting a variable identifying the basic block to the determined ID of the next basic block.

13. The non-transitory machine-readable storage medium of claim 11, wherein the mask is calculated by calculating a first result by bit-wise ANDing the IDs of the first predecessor basic blocks, by calculating a second result by bit-wise ANDing the inverses of the IDs of the first predecessor basic block, and bit-wise ORing the first result and the second result.

14. The non-transitory machine-readable storage medium of claim 11, wherein the first predecessor basic blocks are a plurality of dummy basic blocks, wherein the plurality of dummy basic blocks have a second plurality of predecessor basic blocks, wherein the plurality of dummy basic blocks merge the control flow from the second plurality of predecessor basic blocks to the basic block.

15. The non-transitory machine-readable storage medium of claim 11, wherein instructions for jumping to the next basic block include accessing a table of basic block addresses indexed by basic block IDs based upon the ID of the determined next basic block.

16. The non-transitory machine-readable storage medium of claim 11, wherein instructions for determining the ID of the next basic block is calculated using the following calculation: bb_next=(bb_prev & mask)+(cond ? (ID_then_BB−(ID_prev_BB & mask)):(ID_else_BB−(ID_prev_BB & mask))), where bb_next is the next basic block ID, bb_prev is one predecessor basic block ID, mask if the mask value, cond is a Boolean value or expression, ID_then_BB and ID_else_BB are the IDs of the next basic blocks depending on the value of cond, and ID_prev_BB is the ID of an arbitrary predecessor block.

17. A method of executing instructions of a basic block of software code within a software application including a plurality of basic blocks wherein the basic blocks have an associated identifier (ID) and the basic block is a portion of software code within the software application for execution by a processor, comprising:
determining, by a processor, the ID of a next basic block based upon a mask, an ID of a predecessor basic block, and an ID based upon a condition; and
jumping, by the processor, to the next basic block,
wherein the mask identifies common bits in IDs of a first plurality of predecessor basic blocks and each of the first predecessor basic blocks have a unique ID.

18. The method of claim 17 further comprising:
setting, by the processor, a variable identifying the predecessor basic block to the ID of the basic block; and
setting, by the processor, a variable identifying the basic block to the determined ID of the next basic block.

19. The method of claim 17, wherein the mask is calculated by calculating a first result by bit-wise ANDing the IDs of the first predecessor basic blocks, by calculating a second result by bit-wise ANDing the inverses of the IDs of the first predecessor basic block, and bit-wise ORing the first result and the second result.

20. The method of claim 17, wherein the first predecessor basic blocks are a plurality of dummy basic blocks, wherein the plurality of dummy basic blocks have a second plurality of predecessor basic blocks, wherein the plurality of dummy basic blocks merge the control flow from the second plurality of predecessor basic blocks to the basic block.

21. The method of claim 17, wherein jumping to the next basic block include accessing a table of basic block addresses indexed by basic block IDs based upon the ID of the determined next basic block.

22. The method of claim 17, wherein determining the ID of the next basic block is calculated using the following calculation: bb_next=(bb_prev & mask)+(cond ? (ID_then_BB−(ID_prev_BB & mask)):(ID_else_BB−(ID_prev_BB & mask))), where bb_next is the next basic block ID, bb_prev is one predecessor basic block ID, mask if the mask value, cond is a Boolean value or expression, ID_then_BB and ID_else_BB are the IDs of the next basic blocks depending on the value of cond, and ID_prev_BB is the ID of an arbitrary predecessor block.

* * * * *